2,843,473

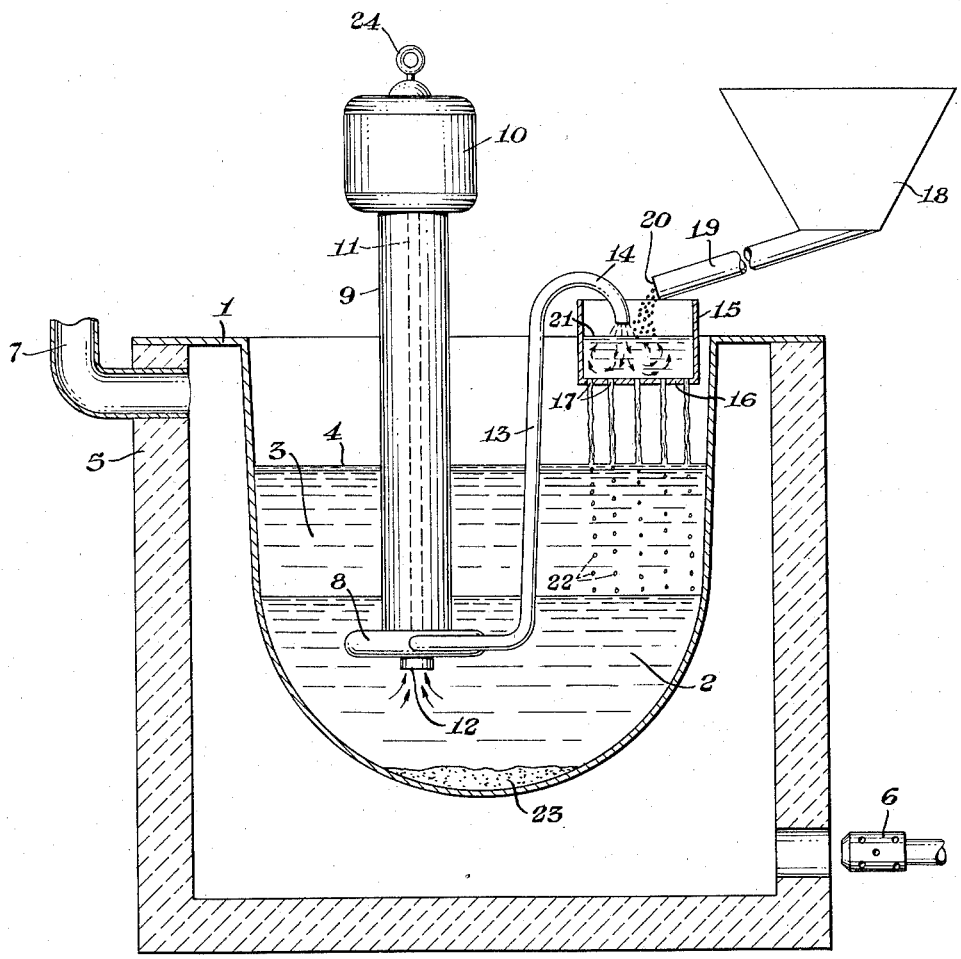

RECLAIMING PARTICULATE MAGNESIUM AND MAGNESIUM-BASE ALLOY SCRAP

Norman R. Colbry, Breckenridge, and Gordon F. Hershey, Midland, Mich., assignors to The Dow Chemical Company, Midland, Mich., a corporation of Delaware Application December 29, 1955, Serial No. 556,281

3 Claims. (Cl. 75—63)

The invention relates to a method of recovering useful metal from finely-divided magnesium and magnesium-base alloy scrap.

In the conventional method of recovering useful metal from finely-divided magnesium and magnesium-base alloy scrap by melting, the particulated metal is introduced into a molten body of saline flux maintained at a temperature below the melting point of the scrap. The resulting mixture is stirred to coat the individual solid metal particles with a film of the flux. The mixture so obtained is heated to a temperature above the melting point of the scrap and agitated to effect coalescence of the resulting molten scrap particles. The coalesced metal is then separated from the flux (see U. S. Patent No. 2,349,190). In carrying out this prior method, the difficulty arises, as in other methods, of avoiding undesirable oxidation of the particulated metal scrap before it becomes protected from oxidation by the flux. Also much of the particulated metal, prior to coating with the flux, reaches a temperature at which the rate of oxidation is fast enough to result in burning. As a consequence, there is considerable loss of metal both from burning and rapid oxidation prior to reaching the burning stage. The method is laborious and slow. Insofar as we are aware, no method is available for reclaiming magnesium and magnesium-base scrap in particulate form which is not laborious and slow and does not entail an undesirable amount of metal loss through oxidation. Accordingly, it is the principal object of the invention to provide a method which overcomes these difficulties. Other objects and advantages will appear as the description of the invention proceeds.

The invention is based upon the discovery that by employing a relatively hot saline flux and mixing with it the particulate metal scrap to be recovered so as to form a fluid slurry of the metal particles and the flux, the particles can be rapidly protected from oxidation. Thereafter the metal particles are separated from the slurry and coalesced. In effecting the separation and coalescence, the slurry is deposited on a flux covered body of molten metal, of the same composition as the scrap to be recovered, floating upon a body of the flux. The slurried particles so-deposited on the flux covered molten metal are absorbed by it and become a part of the molten body while the molten flux thereby separated from the metal maintains the film of flux over the metal and also settles through the molten metal body and enters and becomes a part of the underlying body of flux. By the foregoing method, time and labor is saved and a very high percentage of recovery of scrap is obtained with an inconsequential amount of loss due to oxidation by the atmosphere. The flux used is of the type which provides a protective film over the molten metal and is heavy enough to float the molten metal. Fluxes suitable for the purpose are those composed of alkali and alkaline earth metal halides, including some barium chloride which makes the molten flux heavier than the metal to be recovered, and, if desired, a small amount of calcium fluoride. The flux also may contain either some calcium chloride or magnesium chloride or both of these chlorides. Examples of fluxes of this kind are those containing potassium chloride, magnesium chloride, and barium chloride. A saline flux formulation, we have found satisfactory, for the purpose is one composed of 55 percent potassium chloride, 34 percent magnesium chloride, 9 percent barium chloride, 2 percent calcium fluoride by weight. Another example of a suitable saline flux formulation is one composed of 57 percent potassium chloride, 28 percent calcium chloride, 12.5 percent barium chloride, and 2.5 percent calcium fluoride.

The invention may be further illustrated by reference to the accompanying drawing in which the single figure is a schematic partly sectional view in elevation of an apparatus in which to carry out the method of the invention.

In the drawing, there is shown a melting pot 1 adapted to hold a quantity of fused saline flux 2 and molten metal 3, which being lighter than the flux, floats thereon while a film 4 of the flux extends over the top of the molten metal. As shown the pot is mounted in a conventional furnace setting 5 which is heated by a burner 6. The combustion gases are vented from the setting through the flue 7. Arranged in the pot is a centrifugal pump 8 attached to the lower end of a tubular support 9, the upper end of which carries the motor 10 having a drive shaft 11, within the tube, connected to the working element, not shown, of the centrifugal pump 8. The pump is provided with an inlet 12 and a discharge pipe 13 which extends upwardly from the pump. The upper end of pipe 13 is provided with a downturned spout 14 arranged to discharge into a mixing chamber 15 which is mounted within the melting pot near the top whereby the ambient atmosphere is heated. The bottom 16 of the mixing chamber is provided with numerous small holes 17. A hopper 18 is provided near the melting pot at a height sufficiently above it to permit flow by gravity of the particulate scrap to be recovered through a conduit 19, connected to the bottom of the hopper. The discharge end 20 of the conduit is arranged to discharge into the mixing chamber 15 as shown adjacent to the spout 14.

In operation the melting pot contains a sufficient amount of suitable saline flux 2 to fully submerge the pump 8 as shown. In starting up, it is desirable to provide a body of molten magnesium or magnesium-base alloy, preferably of the same composition as that to be recovered, so as to form a floating mass, e. g. 3, which rests on the body of flux 2. The flux as aforesaid is of the type on which molten magnesium floats and forms a protective layer 4 on the molten body of magnesium 3. The flux and metal in the pot are maintained at a suitable working temperature which is at least 40 centigrade degrees above the melting point of the metal to be recovered and the pump motor 10 is set into operation whereby molten flux is drawn through inlet 12 and discharged through pipe 13 and spout 14 into the mixing chamber 15 at a rate sufficient to maintain a substantial body of the flux in chamber 15 as indicated by numeral 21. As the flux is thus pumped, it passes through the holes 17 in small streams into the melting pot and passes down through the body of molten metal 3 in broken streams indicated by 22. While the flux is thus circulated the particulated metal scrap to be recovered, which is placed in hopper 18, is allowed to flow by gravity through tube 19 into the mixing chamber 15. In the mixing chamber the particles are rapidly engulfed in the moving body of flux flowing thereinto forming a mixture or slurry in the mixing chamber 15. The slurry thus made passes through the openings 17 and falls into the melting pot 1. Inasmuch as the flux is from 40 to 200 centigrade degrees above the melting point of the particulated metal, the particles quickly melt while being fully protected from the atmosphere. On falling into the molten pool of magnesium 3, the metal particles in the slurry immediately contact the molten metal body and become absorbed therein while the flux thereby denuded of metal particles descends into and becomes a part of the molten flux body 2 again to be recirculated by the pump 6 for the preparation of additional slurry from scrap to be recovered. During the operation a small amount of flux spreads over the molten metal body preserving the film 4. Nonmetallic impurities oftentimes associated with the kind of particulate scrap here involved separate from the slurry and settle to the bottom of the pot as a sludge 23.

The molten metal accumulated from the so-melted scrap is removed from time to time from the body 3, as by ladling. In removing the molten metal by a ladle, circulation by the pump is stopped and the flux layer 4 is parted before dipping the ladle into the metal. A preferred way of removing the molten accumulated metal is to raise the pump 6 as by a crane, not shown, attached to the ring 24 so that the inlet 10 of the pump is within the body of molten metal 3 and then to operate the pump for a short time, thereby pumping molten metal instead of flux through the spout 14. A ladle or other vessel may be placed under the spout when raised to catch the discharged molten metal.

The particulated scrap recovered according to the method must be in the form in which it is free flowing, as for example, more or less spherical particles, such as those obtained in some of the atomizing and pelletizing operations applied to magnesium and magnesium-base alloys, e. g. U. S. Patent 2,699,576, the particles having a screen analysis between about 3 and about 100 meshes. A preferred operating temperature is from 700° to 750° C., although temperatures as low as 640° C. may be used, as with the magnesium-base alloys which melt at a temperature as low as 600° C. Temperatures as high as 800° C. may be used. Besides providing a high percentage recovery of metal values, the method has the advantage of refining the metal at the same time. The fire hazard is nil. The method can be operated continuously as by arranging to remove the recovered metal continuously or periodically. The sludge may be removed periodically as by ladling.

The following example is illustrative of the practice of the method:

A saline flux composed of 55 percent potassium chloride, 34 percent magnesium chloride, 9 percent barium chloride, and 2 percent of calcium fluoride in the amount of 450 pounds was melted in a pot similar to 1 of the drawing and its temperature raised to about 700° C. At this temperature the molten flux was pumped at the rate of 10 gallons a minute into a perforated bottom mixing chamber over the melting pot similar to 15 of the drawing. While the flux was so-circulated 8103 pounds of particulated magnesium was introduced into mixing chamber in a steady stream at the rate of about 10 pounds per minute, the stream of particles becoming rapidly engulfed in the flux which swirled about in the chamber 15 as it entered. There was no evidence of burning of the scrap. The resulting mixture of particulated scrap and flux passed through the perforate bottom 16 into the pot 1 where the molten metal particles coalesced to form a mass of molten metal 3 while the flux separated from the mixture in part maintained a protective layer over the molten metal 3 and the balance returned to the flux body 2. From time to time, the pump 8 was raised above the level of the flux so as to pump reclaimed metal out of the melting pot while the pump was thus raised particulate scrap was not fed into the chamber 15. The weight of the reclaimed metal obtained in this way was 7691 pounds, the amount of flux left after the operation was 365 pounds, and the sludge produced weighed 493 pounds. The metal obtained was of acceptable purity for all commercial fabricating operations.

We claim:

1. In a method of recovering finely-divided free flowing magnesium and magnesium-base alloy scrap the steps which comprise bringing together a continuously flowing stream of a molten saline flux derived from a molten body thereof and a continuously flowing stream of the scrap particles so as to rapidly engulf and thereby set the scrap particles with the flux, the said saline flux comprising alkali and alkaline earth metal chloride having a density above that of the molten scrap metal and a temperature of at least 40 centigrade degrees above the melting point of the scrap metal, whereby a slurry is obtained continuously of the scrap metal and the flux, passing the slurry continuously into a pool of the molten metal through a film of flux thereover, said pool floating on the said molten body of the flux, whereby the particles of scrap metal are absorbed by the pool of molten metal and the flux of the slurry thereby denuded of metal descends through the pool of molten metal into the underlying body of flux and maintains a film of the flux thereover, continuously delivering molten flux to the first step, and continuously removing recovered metal from the said pool.

2. In the method according to claim 1 providing a saline flux therefor comprising potassium chloride, magnesium chloride, and barium chloride.

3. In the method according to claim 1 providing a saline flux therefor comprising potassium chloride, calcium chloride, and barium chloride.

References Cited in the file of this patent

UNITED STATES PATENTS

| | | |
|---|---|---|
| 1,180,435 | Robison | Apr. 25, 1916 |
| 1,476,192 | Veazey et al. | Dec. 4, 1923 |
| 2,170,863 | Junker et al. | Aug. 29, 1939 |
| 2,262,105 | Leech et al. | Nov. 11, 1941 |
| 2,349,190 | Newhams | May 16, 1944 |
| 2,620,269 | Haney et al. | Dec. 2, 1952 |

FOREIGN PATENTS

| | | |
|---|---|---|
| 118,538 | Australia | June 1, 1944 |
| 465,870 | Canada | June 13, 1950 |

OTHER REFERENCES

"Iron Age" March 2, 1944, pages 60–61.

UNITED STATES PATENT OFFICE
CERTIFICATE OF CORRECTION

Patent No. 2,843,473                            July 15, 1958

Norman R. Colbry et al.

It is hereby certified that error appears in the printed specification of the above numbered patent requiring correction and that the said Letters Patent should read as corrected below.

Column 4, line 21, claim 1, for "thereby set the scrap" read -- thereby wet the scrap --.

Signed and sealed this 16th day of December 1958.

(SEAL)
Attest:
KARL H. AXLINE
Attesting Officer

ROBERT C. WATSON
Commissioner of Patents